United States Patent [19]

Farley et al.

[11] Patent Number: 4,812,283

[45] Date of Patent: * Mar. 14, 1989

[54] METHOD OF MANUFACTURE OF FORMED ARTICLE

[75] Inventors: Radcliffe W. Farley, Worcester, Pa.; Edward A. Vaughn, Clemson, S.C.; Clarke A. Rodman, East Providence, R.I.; Edward C. Homonoff, Brooklyn, Conn.

[73] Assignee: Allied-Signal Inc., Morristown, N.J.

[*] Notice: The portion of the term of this patent subsequent to May 5, 2004 has been disclaimed.

[21] Appl. No.: 858,785

[22] Filed: May 2, 1986

[51] Int. Cl.⁴ .................. B29C 43/02; D04H 1/54
[52] U.S. Cl. .................. 264/518; 264/517; 264/544; 264/119; 264/122; 264/128
[58] Field of Search ......... 264/517, 518, 121, 119, 264/128, 122, 544, 546

[56] References Cited

U.S. PATENT DOCUMENTS

| | | | |
|---|---|---|---|
| 2,459,804 | 1/1949 | Francis | 428/174 |
| 2,521,985 | 9/1950 | Lang et al. | 156/62.8 |
| 2,543,101 | 2/1951 | Francis | 264/112 |
| 2,847,712 | 8/1958 | Pollard et al. | |
| 3,007,206 | 11/1961 | Griswold | 264/544 |
| 3,054,714 | 9/1962 | Johnston | 264/518 |
| 3,850,723 | 11/1974 | Ackley | |
| 3,880,975 | 4/1975 | Lundmark | 264/119 |
| 3,918,126 | 11/1975 | Wood | 264/518 |
| 4,258,093 | 3/1981 | Benedyk | 428/85 |
| 4,287,143 | 9/1981 | Sears, Jr. et al. | |
| 4,359,132 | 11/1982 | Parker et al. | 264/122 |
| 4,373,001 | 2/1983 | Smith et al. | 428/212 |
| 4,375,447 | 3/1983 | Chung | 264/518 |
| 4,379,101 | 4/1983 | Smith | 264/119 |
| 4,385,954 | 5/1983 | Pauls et al. | 264/518 |
| 4,418,031 | 11/1983 | Doerer et al. | |
| 4,609,519 | 9/1986 | Pichard et al. | 264/510 |
| 4,649,014 | 3/1987 | Tochikawa | 264/555 |

FOREIGN PATENT DOCUMENTS

| | | | |
|---|---|---|---|
| 0118361 | 9/1984 | European Pat. Off. | 264/112 |
| 0124387 | 11/1984 | European Pat. Off. | |
| 0148763 | 7/1985 | European Pat. Off. | |
| 0152994 | 8/1985 | European Pat. Off. | |
| 59-59433 | 4/1984 | Japan | 264/119 |
| 2015420 | 9/1979 | United Kingdom | |

OTHER PUBLICATIONS

Shell Technical Brochure.

*Primary Examiner*—Jan H. Silbaugh
*Assistant Examiner*—Mary Lynn Fertig
*Attorney, Agent, or Firm*—Ken C. Decker; William N. Antonis

[57] ABSTRACT

A molded article, for example, a filter or a preform used in the manufacture of fiber-reinforced composites, is manufactured from an air laid batt from a single fiber type or a mixture of fibers. The batt is either resinated with a thermoplastic material or includes a thermoplastic binder fiber. The batt is formed into the desired shape of the molded article in a through-air mold and heated sufficiently to set the thermoplastic material, so that the resulting article retains the desired shape. If the article is to be used as a fluid filter, it can be used either as it is removed from the mold if a filter of uniform density is desired, of the article can be further processed in a compression mold to densify portions of the article to thereby form, for example, a fluid impervious portion used as a gasket. If the article is to be used as a preform for a structural composite, it is then to be transferred to a resin injection mold.

8 Claims, 3 Drawing Sheets

METHOD OF MANUFACTURE OF FORMED ARTICLE

This invention relates to a method of forming having a relatively open structure, such as formed fluid filters or preforms for structural composites.

Fluid filters are commonly made from pleated paper, which must be supported by screens, center tubes, end caps, etc. thus requiring substantial labor for their assembly. Accordingly, it is desirable to manufacture fluid filters from a wholly automated process. This appears to be possible only if filters are molded from nonwoven materials. Accordingly, the present invention discloses a process for forming molded articles from a nonwoven, air laid material. The articles can be used as fluid filters. Portions of the filter can be compressed to vary the density of the filter material. It is possible to make portions of the filter impervious to fluid flow thus forming a seal as part of the filter.

Molded articles made persuant to this invention can also be used as preforms in the manufacture of structural composites. Reference is to co-pending U.S. patent application Ser. No. 858,974, now U.S. Pat. No. 4,663,225, for a complete discussion of the manufacture of composite materials from an air laid, nonwoven batt. However, in the process disclosed in aforemention application, it is necessary to mold the batt into a preform before impregnating the preform with the appropriate resin matrix. The present invention, then, discloses a method which can be used to make such a preform.

Accordingly, the present invention has advantages over the prior art in that it discloses a method for manufacturing molded articles from air laid nonwoven batts. These molded articles may have many uses, including use as a fluid filter or as a preform for a structural composite.

These and other features of the invention will become apparent from the following description, with reference to the accompanying drawings, in which.

Figure 1:
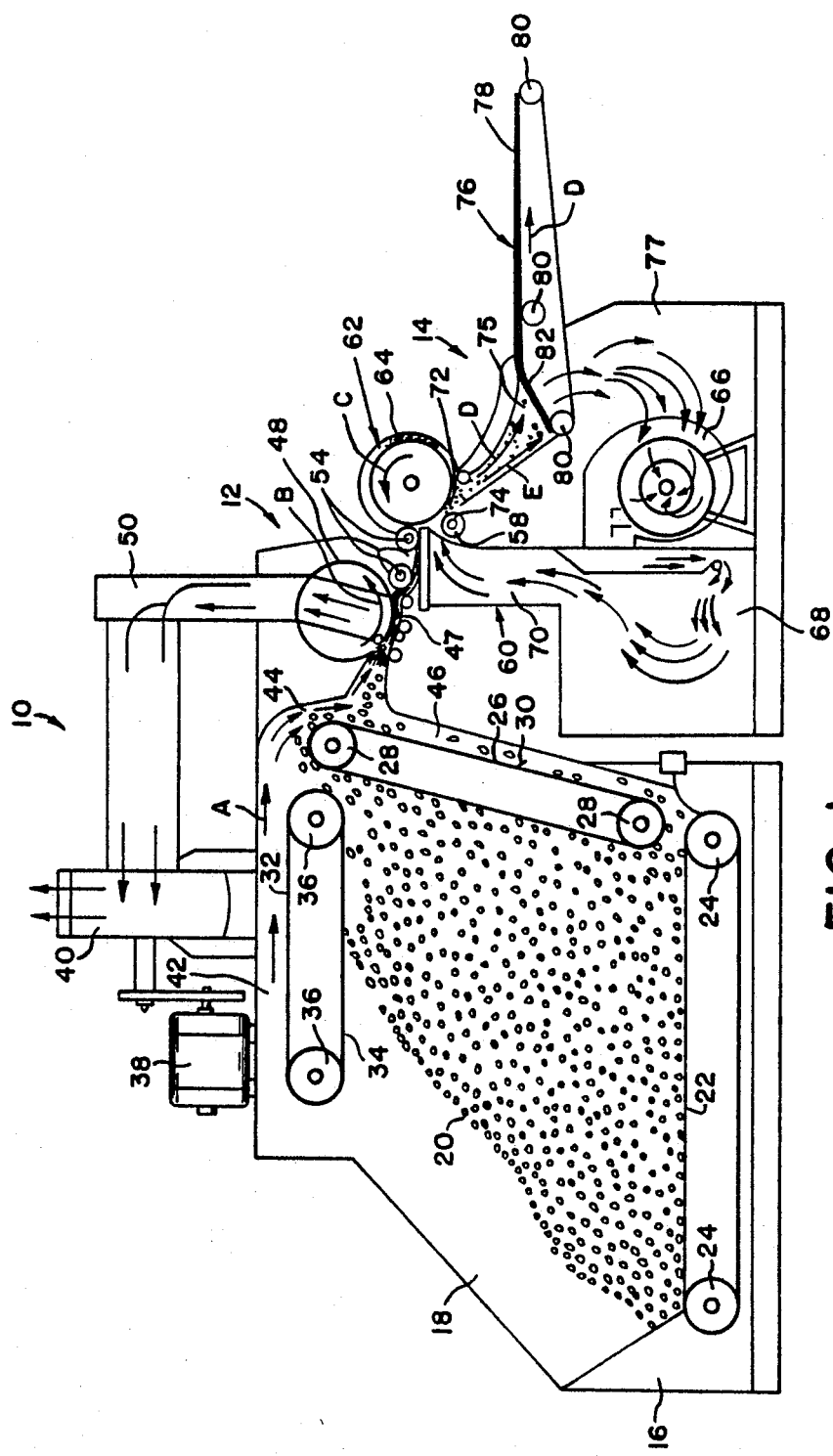
FIG. 1 is a cross-sectional view schematically illustrating an air laid nonwoven batt formation machine.
Figure 2:
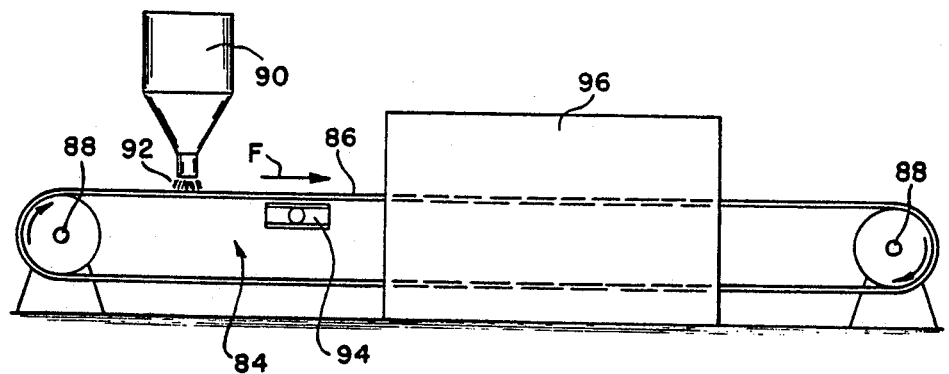
FIG. 2 is a view of the conveyer line which treats the batt formed by the machine illustrated in FIG. 1 as it is removed from the machine.

Referring now to the FIG. 1 of the drawing, an airlaid, nonwoven, batt-formation machine is generally indicared by the numeral 10 and is of the type generally illustrated in U.S. Pat. No. 3,918,126. The machine 10 is comprised of a feeding mechanism generally indicated by the numeral 12 and a web-formation mechanism generally indicated by the numeral 14.

Feeding mechanism 12 includes a housing 16 which encloses a relatively large hopper 18 which receives the fiber from which the web or batt is to be manufactured. Of course, the fibers are first opened and blended in the conventional manner before being placed in the hopper 18. The fiber mixture includes staple structural fibers such as curled or uncurled fiberglass, graxhite fibers and/or high strength polyester. Also, thermoplastic fibers are included if the batt is not to be resinated with a thermoplastic material. In the preferred embodiment, the fibers in the hopper 18 are comprised of 52.5% curled fiberglass, available commercially from Owens-Corning Fiberglass Corporation; 17.5% Compet® polyester fiber, available commercially from Allied Corporation; and 30% of a thermoplastic binder fiber such as Vinyon®, available commerically from Celeanese Corporation; polyester fibers such as Dacron®, available commercially from DuPont Corporation or Kodel®, available commercially from Eastman Kodak Company. The blended fibers are indicated by the reference numeral 20. A conveying apron 22 is mounted on rollers 24 located within the hopper 18 which are turned in the direction of the arrows by an appropriate power source (not shown), to move the fibers 20 to the right viewing FIG. 1 toward an elevating apron generally indicated by the numeral 26. The elevating apron 26 is mounted on rollers 28 located within the hopper and is provided with elongated spikes 30 extending therefrom. The rollers are operated by a power source such that the fibers are moved upwardly, viewing FIG. 1. A stripper apron 32 is provided with spikes 34 and is wrapped about rollers 36 which are also operated by a power source. A power source 38 operates a fan 40 which draws air through channel 42 defined between the stripper apron 32 and the upper wall of the housing 16, generally in the direction of the Arrow A. The metered airflow through the channel 42 removes a predetermined quantity of the fibers 20 from the elevating apron 26. The remaining fibers are returned to the hopper through channel 46, defined between the elevator apron 26 and the corresponding wall of the housing 16. The metered airflow indicated by Arrow A forces the fibers into a duct 44 defined between the upper edge of the elevating apron 26 and the corresponding wall of the housing 16.

The fibers are then consolidated into a feed mat 47 by the air flowing through the channel 42 and the duct 44. This air flow enters a cylinderical, porous condenser screen 48 which is rotated in the direction of the Arrow B by an appropriate power source (not shown). The air flow is ducted back to the blower 40 by ductwork generally indicated by the numeral 50. The rotating screen 48 compresses the feed mat 47 by cooperating with feed rollers 52, which cooperate with mechanical rolls 54 to advance the feed mat toward the mat formation mechanism, generally indicated by the numeral 14. The fibers are then brushed off nosebar 58 which is carried on housing 60 forming a part of the web formation mechanism 14 by a rotating lickerin generally indicated by the numeral 62. The lickerin 62 is provided with a serrated surface defining spikes or teeth 64 across the entire width and around the circumference of lickerin 62. The lickerin 62 is powered for rotation as indicated by the Arrow C.

The fibers are doffed from lickerin 62 by centrifical forces generated by the rotating speed of the lickerin 62 and also by air flow provided by a blower 66. Blower 66 blows air into a chamber 68 defined within the housing 60 which is guided through a duct 70 and into a channel 72 defined between a saber 74 and the lickering 62. The blended fibers are removed from the lickering and are conveyed by the air stream through a duct 75 to a foraminous conveyer, generally indicated by the numeral 76. The inlet of the blower 66 is connected to a chamber 77 defined within the housing 60 which in turn is communicated to the duct 75 through the foraminous conveyer 76. The foraminous conveyer 76 includes a foraminous belt 78 mounted on rollers 80 which move the belt in the direction indicated by the Arrow D. Since the belt 78 is porous and permits air flow therethrough, the blower 66 is capable of circulating air through the channel 72, the duct 74, the chambers 77 and 68, and the duct 70. Accordingly, the fibers are doffed from the lickerin 62 and blown through the duct 74 and are condensed on a portion 82 of the foraminous belt 78 to form a nonwoven mat. Since the foraminous belt 78 is rotated around the rollers 80 the mat eventually exits from the portion of the belt covered by the duct 74.

The rotating speed of the lickerin 62 and the quantity of air pumped by the blower 66 may be adjusted in a conventional manner to adjust the weight of the batt formed by the web formation machine 10. Although lighter weight batts are acceptable, the invention perfers that relatively heavy batts, of a weight, for example, of four ounces/square yard or greater, are preferred because batts of this weight provide a sufficient quantity of fiber reinforcement for the structural composite to be manufactured as hereinafter described. It is also important that the fibers comprising the batt, which are randomly arrayed due to being blown through the duct 74, be sufficiently long that they cross each other a number of times, thereby providing relative attraction forces between the fibers so that each fiber can hold other fibers in place. It is preferred that fibers of at least one inch in length be used, since tests have shown that fibers of this length engage other fibers in the batt an average of three times, thus providing the number of engagements with other fibers necessary to form a satisfactory batt. Fibers of shorter length may be used, but they would, of course, engage other fibers, on average, fewer times, thus providing a batt with less intergrity.

As discussed above, an important feature of the invention is that structural composites formed from the batts produced have strength in all three spatial dimensions. The strengh is provided by the reinforcement provided by the fibers used to make the composite. Accordingly, the nonwoven batt formed by the machine 10 will have randomly arrayed fibers which extend in all three spatial dimensions, since the random orientation of the fibers is a necessary consequence of the air formation process. However, it has been shown that the percentage of fibers arranged in the direction of the depth of the batt varies considerably, depending upon the direction of air flow through the duct 74. This direction is controlled by the spacing between the saber 74 and the lickerin 62. The saber 74 is mounted on an eccentric, so that its position relative to the lickerin, 62 is adjustable, thereby making the width of the channel 72 also adjustable. Normally, the saber 74 is spaced away from the lickerin 62 so that the air flow through the channel 72 tends to follow the shape of the channel in the direction of the Arrow D. While batts formed with air flow in this direction will have some fibers having components oriented in the direction of the depth of the batt, the majority of fibers will be oriented along the length and the width of the batt. However, it has been discovered that by moving the saber, 74 closer to the lickering 62 and by adjusting the blower 66 accordingly, a venturi effect is created which deflects the air flow in the direction of the Arrow E. Batts formed in this manner have been found to have about 30% of their fibers having components oriented in the direction of the depth of the batt. Accordingly, a composite material formed from a batt having 30% of the fibers oriented in the depth direction will have almost the same strenth in all three spatial dimensions.

The machine 10 has been described in accordance with the feeding mechanism 12. However, the purpose of the feeding mechanism 12 is to produce the feed mat 46 for the web formation mechanism 14. As is well know to those skilled in the art, the feed web may also be formed from a roller card and cross-lapping machine. This latter mechanism may be more efficient for a high volume production. Alternatively, the feed web may also be formed by a picker. This system may be more efficient for producing diversified short-run lots.

The batt is transferred from the conveyor 78 onto an adjacent conveyer 84 which includes a formainous belt 86 powered for rotation about rollers 88 in the direction indicated by the Arrow F. If the batt is to be resinated in lieu of using binder fibers or in addition to using binder fibers, an appropriate foamed resin is poured into the hopper 90 and is dispensed onto the batt traveling on the belt or conveyer 86 through nozzles 92. Since the belt 86 is foraminous, the foam can be pulled through the batt to saturate the same by applying a vacuum on the underside of the batt through the vacuum puller 94. The excess foam is pulled into the vacuum puller 94 and is recirculated into the hopper 90. The batt is then carried on the belt 86 through an oven 96 which is heated to a temperature just over 200° F., which heats the batt sufficiently to stablize the batt and to permit its handling. The batt therefore is heated to a temperature to soften, but not melt, the thermoplastic binder fibers or the resin applied to the batt, both of which have a melting temperature of about 250° F. As discussed above, the purpose of the oven 96 is to stabilize the batt to permit handling without breaking it apart. If, because of the fibers used, the batt does not easily pull apart as formed, the oven 96 may be eliminated.

Figure 3:
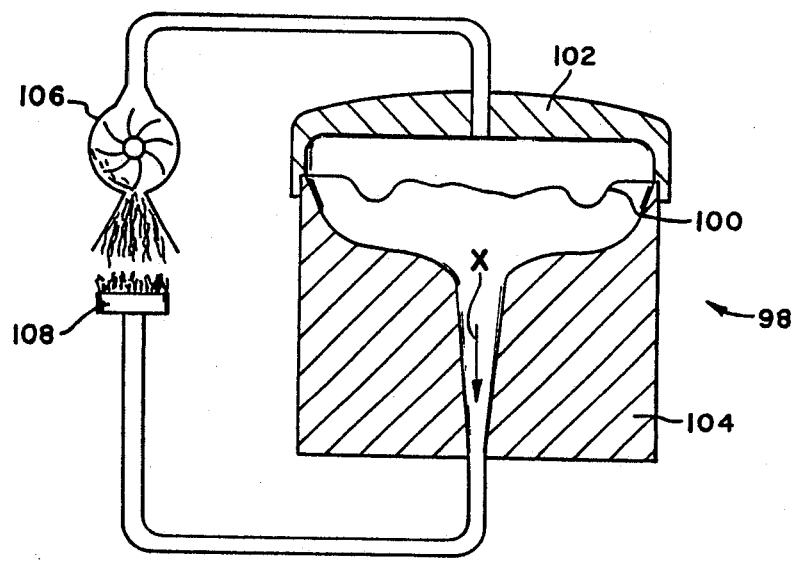
FIG. 3 is a cross-sectional view of a diagrammatic representation of a contour mold used to form the batt made by the machine of FIG. 1 into a preform shape.

The molded article is made in a contour mold, generally indicated by the numeral 98 in FIG. 3. The mold 98 is preferably a conventional through-air mold and includes a gas-permeable screen 100 which is contoured in the shape of the preform to be molded. A portion of the batt is placed on the screen 100 and the cover 102 of the mold is closed upon the body 104 thereof and a gas-impermeable seal is effected therebetween. A fan 106 circulates air in the direction of the Arrow X so that the batt is forced to assume the contours of the screen 100 by virtue of the gas being forced therethrough. Although air would normally be used, it is possible in certain applications that a gas other than air may be necessary. The gas being circula ed through the mold is heated by a burner 108 to a termperature sufficient to melt the thermoplastic binder material (either the binder fibers or the resin applied to the batt), thereby causing the batt to fuse in a shape-retaining contour of the screen 100.

Of course, the stiffness of the batt will depend upon the percentage of binder fiber and/or thermoplastic resin used in the batt. A higher concentration of binder fiber will produce a stiffer article. However, a higher concentration of binder material may cause excessive or undersirable shrinkage of the batt. It is also desirable that the batt not be excessively compressed as it is formed, particularly if the article is to be used as a fluid filter, where it is necessary to maintain the open characteristics of the batt to minimize the restrictions of fluid flow therethrough while permitting the fibers to keep particles entrapped in the fluid. If the article is to be used as a preform for a structural composite, it is desirable to retain the open characteristic of the batt as much as possible to facilitate resin transfer into the batt. Although molds other than the through-air mold shown in FIG. 3, such as a conventional press type mold, may be used, care must be taken that the batt may not be excessively compressed, although slight compression is unavoidable in forcing the batt to assume the complex contours of the mold.

Figure 4:
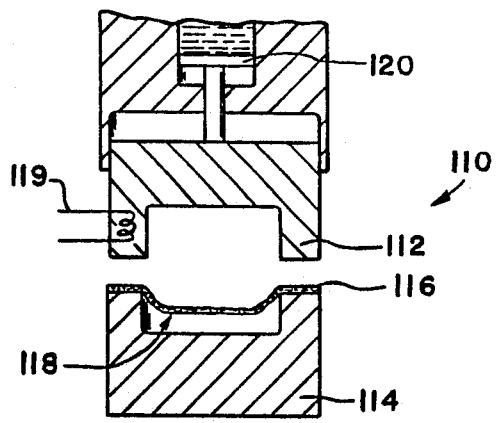
FIG. 4 is a cross-sectional view of a diagrammatic representation of a compression mold.
Figure 5:
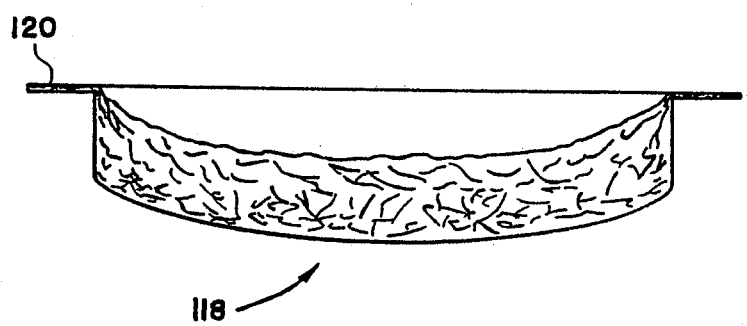
FIG. 5 is a perspective view of an article made by the process illustrated in FIGS. 1-4.

The molded article is then removed from the contour mold 98. If, for example, the article is to be used as a fluid filter, and is not to have variant densities, it can be used as it is removed from the mold. However, if the fluid filter is to have portions which are of a density greater than other portions, it is transferred to a compression mold illustrated in FIG. 4 by the numeral 110. Mold 110 has contoured shaped portions 112 and 114 which are adapted to apply compressive force to at least some portions of the batt, such as the peripheral portions indicated by the numeral 116. It is also desirable to heat the batt to a temperature sufficient to melt the thermoplastic fibers and/or thermoplastic material in the batt. If the aforementioned Vinyon ® fiber is used as the binder material, it is sufficient to heat the mold portion 112 to a temperature of about 200° F., (preferably by incorporation an electrical resisance heater 119 in the mold) which is about the temperature of which the Vinyon ® melts. Accordingly, when pressure is applied to the portion 116 of the article, this portion is densified, thus inhibiting fluid flow therethrough. Accordingly, referring now to FIG. 5, the fluid filter indicated by the numeral 118 can be provided with a peripheral flange portion 120 which is substantially impervious to fluid flow and which, accordingly, serves as a gasket when the filter 116 is installed in an appropriate air cleaning device. Pressure is applied to the mold portions 112 and 114 by a hydraulic actuator indicated digramatically at 120.

If the molded article is to be used as a preform and a fiber reinforced composite, the preform is then transferred to a resin injection mold described in the aforementiond U.S. patent application 858,974, now U.S. Pat. No. 4,663,225. The preform is then injected with the appropriate resin matrix and compressed to form the final article, thus increasing the density of the fibers in the molded compostte article as described in the aforementioned patent application.

Although the invention has been described in connection with the use of staple structural fibers for the manufacture of the air laid nonwoven batt, fibers and forms other than cut staple fibers may be used. For example, continous filament tow may be used and processed and blended as described in U.S. Pat. No. 4,514,880. Accordingly, the invention is not limited to the examples and bodiments specifically described in the foregoing specification, but is instead limited only by the scope of the following claims.

We claim:

1. Method of manufacturing molded articles comprising the steps of forming a nonwoven, air laid batt from structural fibers by pneumatically conveying the fibers in an air stream randomly depositing said fibers on a condenser to form a nonwoven gas permeable, compressible batt having a substantial portion of its fibers interlocking randomly in each of the three spatial dimensions, adding a thermoplastic binder material to the fibers molding the batt by forcing a gas through the batt to thereby mold the batt without substantial compression of the batt, and heating the batt during molding to a temperature to at least partially melt the binder material to form the batt into a shape-retaining article.

2. Method of manufacturing molded articles as claimed in claim 1, wherein said step of adding a thermoplastic binder material is effected by mixing the structural fibers with thermoplastic binder fibers and pneumatically conveying said mixture of fibers to said condenser.

3. Method of manufacturing molded articles as claimed in claim 1, wherein said step of adding a thermoplastic binder material is effected by applying a thermoplastic compound to the batt after the batt is laid.

4. Method of manufacturing molded articles as claimed in claim 1, wherein the batt is heated to a lower temperature before the batt is molded to stabilize the batt and to permit handling of the batt without tearing the batt apart and then heating the batt to a higher temperature sufficient to at least partially melt the binder material as the batt is formed into the molded article.

5. Method of manufacturing molded article as claimed in claim 1, wherein the batt is formed into the molded article by placing the batt on a gas permeable member having a desired shape and then drawing gas through the batt and the gas permeable member to force the batt to assume the contours of the gas permeable member.

6. Method of manufacturing molded article as claimed in claim 1, wherein the batt is heated during molding by heating the gas drawn through the batt.

7. Method of manufacturing molded article as claimed in claim 1, wherein the direction of the air stream conveying said fibers is adjusted relative to the conveyer to control the percentage of the fibers having a directional composite extending across the depth of the batt.

8. Method of manufacturing molded articles as claimed in claim 1, wherein said batt is molded in a contour mold into a preform shape and then transferred to another mold for molding into a final shape.

* * * * *